United States Patent
Hong

(10) Patent No.: US 10,824,890 B2
(45) Date of Patent: Nov. 3, 2020

(54) LIVING BODY DETECTING METHOD AND APPARATUS, DEVICE AND STORAGE MEDIUM

(71) Applicant: BAIDU ONLINE NETWORK TECHNOLOGY (BEIJING) CO., LTD., Haidian District Beijing (CN)

(72) Inventor: Zhibin Hong, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 91 days.

(21) Appl. No.: 16/022,124

(22) Filed: Jun. 28, 2018

(65) Prior Publication Data
US 2019/0026575 A1 Jan. 24, 2019

(30) Foreign Application Priority Data
Jul. 20, 2017 (CN) .................. 2017 1 05968135

(51) Int. Cl.
*G06K 9/00* (2006.01)
*G06T 7/00* (2017.01)

(52) U.S. Cl.
CPC ..... *G06K 9/00899* (2013.01); *G06K 9/00288* (2013.01); *G06T 7/0012* (2013.01); *G06T 2207/30196* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,457,432 | B2 * | 11/2008 | Ai | G06K 9/00228 348/169 |
| 9,552,510 | B2 * | 1/2017 | Li | G06K 9/00315 |
| 10,430,946 | B1 * | 10/2019 | Zhou | G16H 50/20 |
| 2005/0249429 | A1 * | 11/2005 | Kitamura | G03B 17/00 382/255 |
| 2008/0259154 | A1 * | 10/2008 | Garrison | H04N 7/14 348/14.01 |
| 2010/0111370 | A1 * | 5/2010 | Black | G06K 9/00369 382/111 |

(Continued)

FOREIGN PATENT DOCUMENTS

| | | |
|---|---|---|
| CN | 103379282 A | 10/2013 |
| CN | 104915649 A | 9/2015 |
| CN | 105512637 A | 4/2016 |

OTHER PUBLICATIONS

Chinese Office Action dated Mar. 13, 2020, for related Chinese Appln. No. 201710596813.5; 4 Pages.

(Continued)

*Primary Examiner* — Omar S Ismail
(74) *Attorney, Agent, or Firm* — Brooks Kushman PC

(57) ABSTRACT

The present disclosure provides a living body detecting method and apparatus, a device and a storage medium. The method comprises: obtaining user pictures collected by a fixed-focal-length camera at a fixed position, the user pictures being full-length or half-length pictures; determining whether the user is a living body according to a clarity degree of collected user pictures and whether there is a rim. The solution of the present disclosure can be applied to simplify user's operations and improve accuracy of detection results.

9 Claims, 3 Drawing Sheets

(56) References Cited

U.S. PATENT DOCUMENTS

| | | | | |
|---|---|---|---|---|
| 2010/0278426 | A1* | 11/2010 | Piramuthu | G06T 7/11 |
| | | | | 382/173 |
| 2011/0135166 | A1* | 6/2011 | Wechsler | G06K 9/627 |
| | | | | 382/118 |
| 2012/0057748 | A1* | 3/2012 | Katano | G06T 7/248 |
| | | | | 382/103 |
| 2012/0117084 | A1* | 5/2012 | Tang | G06T 7/246 |
| | | | | 707/748 |
| 2012/0301032 | A1* | 11/2012 | Kawanishi | G06F 16/583 |
| | | | | 382/190 |
| 2013/0223694 | A1* | 8/2013 | Ricanek, Jr. | G06T 11/206 |
| | | | | 382/118 |
| 2013/0286256 | A1* | 10/2013 | Choi | G06K 9/00899 |
| | | | | 348/240.2 |
| 2014/0355861 | A1* | 12/2014 | Nirenberg | G06K 9/4619 |
| | | | | 382/133 |
| 2015/0269736 | A1* | 9/2015 | Hannuksela | H04N 13/122 |
| | | | | 345/419 |
| 2016/0070968 | A1* | 3/2016 | Gu | G06T 7/32 |
| | | | | 382/125 |
| 2016/0148077 | A1* | 5/2016 | Cox | G06K 9/6263 |
| | | | | 382/159 |
| 2016/0300351 | A1* | 10/2016 | Gazit | G06T 7/187 |
| 2018/0060648 | A1* | 3/2018 | Yoo | G06K 9/00268 |
| 2019/0019046 | A1* | 1/2019 | Zhou | G06K 9/6215 |
| 2019/0026575 | A1* | 1/2019 | Hong | G06T 7/0012 |

OTHER PUBLICATIONS

Chinese Search Report dated Mar. 3, 2020, for related Chinese Appln. No. 201710596813.5; 2 Pages.

* cited by examiner

LIVING BODY DETECTING METHOD AND APPARATUS, DEVICE AND STORAGE MEDIUM

The present application claims the priority of Chinese Patent Application No. 201710596813.5, filed on Jul. 20, 2017, with the title of "Living body detecting method and apparatus, device and storage medium". The disclosure of the above applications is incorporated herein by reference in its entirety.

FIELD OF THE DISCLOSURE

The present disclosure relates to computer application technologies, and particularly to a living body detecting method and apparatus, a device and a storage medium.

BACKGROUND OF THE DISCLOSURE

As compared with other biological feature recognition technologies, a human face recognition technology has unique advantages in practical application: human face can be directly acquired via a camera, and the recognition procedure may be completed in a non-contacting manner conveniently and quickly.

Currently, human face recognition technology is already applied to many fields such as financing, education, scenic spots, travel and transport and social insurance. However, the human face recognition technology brings about convenience as well as some problems. For example, human face can be easily acquired so that human face can be duplicated by some people with pictures or video to achieve the purpose of stealing information. Particularly in the new financing industry, human face recognition technology is already gradually applied to remote account opening, money withdrawal, payment and so on, and involves users' interests.

To this end, a living body detection technology is proposed in the prior art. Plainly speaking, the so-called living body detection means detecting that the face corresponds to a "living person" during human face recognition.

Sources of non-living bodies are wide, and include photos and video displayed on a mobile phone or Pad, and printed photos of different materials (including curving, folding, clipping and hole-digging in various cases), and so on.

The living body detection is applied on important occasions such as social insurance and online account opening. For example, pension cannot be withdrawn unless an elderly user's identity is determined authentic and the elderly user is still alive through verification. Upon online account opening, this can ensure authenticity, validity and safety of the user information.

In the prior art, it is possible to recognize whether the user is a living body by asking the user to make an act such as blink, nod, or open mouth. However, this manner requires the user to cooperate to perform a corresponding act, is troublesome for the user, and furthermore the accuracy of a detection result is low. For example, an illegal user obtains a legal user's video by seeking for the legal user's video or shooting the legal user's video through a pinhole video camera, thereby launching an attack by playing back the video.

SUMMARY OF THE DISCLOSURE

In view of the above, the present disclosure provides a living body detecting method and apparatus, a device and a storage medium, which can simplify user's operations and improve accuracy of detection results.

Specific technical solutions are as follows:

A living body detecting method, comprising:

obtaining user pictures collected by a fixed-focal-length camera at a fixed position, the user pictures being full-length or half-length pictures;

determining whether the user is a living body according to a clarity degree of collected user pictures and whether there is a rim.

According to a preferred embodiment of the present disclosure, before obtaining user pictures collected by a fixed-focal-length camera at a fixed position, the method further comprises:

obtaining user pictures serving as training samples respectively, the training samples comprising positive samples and negative samples, the training samples being the user pictures collected with the fixed-focal-length camera;

obtaining a classification model by training according to the training samples;

the determining whether the user is a living body according to a clarity degree of collected user pictures and whether there is a rim comprises:

inputting the collected user pictures into the classification model to obtain a detection result about whether the user in the output user pictures is the living body.

According to a preferred embodiment of the present disclosure, a manner of obtaining the positive samples comprises:

obtaining user pictures collected with the fixed-focal-length camera when the user is located in a designated area, as positive samples;

the designated area being an area which corresponds to a focal length of the fixed-focal-length camera and can collect clear pictures.

According to a preferred embodiment of the present disclosure, the obtaining user pictures collected with the fixed-focal-length camera when the user is located in a designated area comprises:

respectively obtaining user pictures collected with the fixed-focal-length cameras when the user is located at different positions in the designated area.

A living body detecting apparatus, comprising an obtaining unit and a detecting unit;

the obtaining unit is configured to obtain user pictures collected by a fixed-focal-length camera at a fixed position, the user pictures being full-length or half-length pictures;

the detecting unit is configured to determine whether the user is a living body according to a clarity degree of collected user pictures and whether there is a rim.

According to a preferred embodiment of the present disclosure, the apparatus further comprises: a pre-processing unit;

the pre-processing unit is configured to obtain user pictures serving as training samples respectively, the training samples comprising positive samples and negative samples, the training samples being the user pictures collected with the fixed-focal-length camera, and obtain a classification model by training according to the training samples;

the detecting unit inputs the collected user pictures into the classification model to thereby obtain a detection result about whether the user in the output user pictures is the living body.

According to a preferred embodiment of the present disclosure, the pre-processing unit is configured to obtain user pictures collected with the fixed-focal-length camera when the user is located in a designated area, as positive samples;

the designated area being an area which corresponds to a focal length of the fixed-focal-length camera and can collect clear pictures.

According to a preferred embodiment of the present disclosure, the pre-processing unit is configured to respectively obtain user pictures collected with the fixed-focal-length cameras when the user is located at different positions in the designated area.

A computer device, comprising a memory, a processor and a computer program which is stored on the memory and runnable on the processor, wherein the processor, upon executing the program, implements the above-mentioned method.

A computer-readable storage medium on which a computer program is stored, wherein the program, when executed by a processor, implements the aforesaid method.

As can be seen from the above introduction, according to solutions of the present disclosure, it is possible to obtain user pictures collected by the fixed-focal-length camera at a fixed position, the user pictures being full-length or half-length pictures, and then determine whether the user in the user pictures is a living body according to a clarity degree of collected user pictures and whether there is a rim. That is, it is feasible to distinguish whether the user is a living body by using properties of the fixed-focal-length camera and according to the clarity degree of user pictures collected by the fixed-focal-length camera. As such, legal users only need to stand in the designated area corresponding to the focal length of the fixed-focal-length camera without need to cooperatively make acts such as blinking, nodding or opening mouth, thereby simplifying the user's operations. In addition, when an illegal user employs an attack manner such as video or picture, since the size of the picture is distinct from the size of the real user, it is necessary to approach the fixed-focal-length camera more than the real user to take a picture to obtain a full-length or half-length picture, thereby causing a large difference of the clarity degree between the collected user picture and the real user's picture, and thereby accurately detecting a non-living body based on the clarity degree, namely, improving the accuracy of the detection result; furthermore, it is also possible for the illegal user to employ an attack manner such as clipping a human face or using a screen to display a human face (placing in a facial area). Since the user picture collected in the above method embodiments is a full-length picture or half-length picture, it is very probably exposed out of the edge of the sheet of paper or rim of the screen so that the non-living body can be accurately detected; it can be seen that the solutions of the present disclosure produce a better detection effect for various attack manners, and widely adapted.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
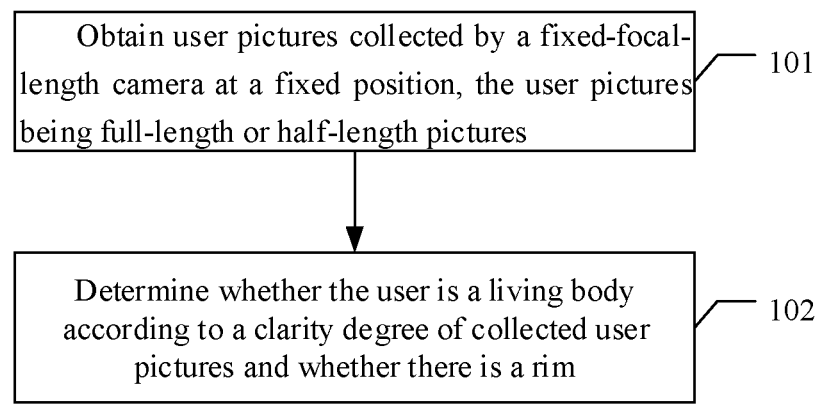
FIG. 1 is a flow chart of an embodiment of a living body detecting method according to the present disclosure.

FIG. 1 is a flow chart of an embodiment of a living body detecting method according to the present disclosure. As shown in FIG. 1, the embodiment comprises the following specific implementation mode.

In 101 is obtained user pictures collected by a fixed-focal-length camera at a fixed position, the user pictures being full-length or half-length pictures;

In 102, whether the user is a living body is determined according to a clarity degree of collected user pictures and whether there is a rim.

Since the fixed-focal-length camera has a fixed focal length, namely, an irradiation distance, a width and the like are fixed, when the location of the fixed-focal-length camera is fixed, images can be formed clearly only for a specific area, and image cannot be formed clearly outside the area.

Therefore, when the living body detection is performed, the user may be required to stand in a designated area (namely, the above-mentioned specific area), so that the fixed-focal-length camera is used to collect pictures of the user and obtain the user's pictures, which may be full-length or half-length pictures. The obtained user's picture will be clear pictures. As far as illegal user's attack is concerned, for example, the attack is launched in a way of using pictures displayed on a mobile phone and Pad, or various printed pictures of different materials. Since the size of the pictures is distinct from the size of the real user, it is necessary to approach the fixed-focal-length camera to take a picture to obtain a full-length or half-length picture. However, the so doing causes vague imaging, i.e., the clarity of the user picture collected by the fixed-focal-length camera is very poor. In this way, whether the user is a living body may be determined based on the clarity degree of the collected user pictures. In addition, it is also possible for the illegal user to employ an attack manner such as clipping a human face or using a screen to display a human face (placing in a facial area). Since the user picture collected in the present embodiment is a full-length picture or half-length picture, it is very probably exposed out of the edge of the sheet of paper or rim of the screen so that the non-living body can be accurately detected.

Since the clarity degree of the picture is very difficult to evaluate with a definite index, the present embodiment proposes that a classification model may be obtained by pre-training in a deep learning manner. The process of training the classification model is a learning process. It is possible to learn what clarity degree meets requirements, and thereby judge the user in the user picture whose clarity degree meets requirements as a living body Specific implementations of the above portions are respectively described in detail.

1) The Classification Model

To train to obtain the classification model, it is necessary to first obtain user pictures as training samples. The training samples need comprise positive samples and negative samples.

A manner of obtaining the positive samples may be: obtaining user pictures collected with the fixed-focal-length camera when the user is located in a designated area. The designated area is an area which corresponds to the focal length of the fixed-focal-length camera and can collect clear pictures.

Since the designated area is usually an area of a certain size, when the user stands in the designated area, he might stand at different positions, for example, exactly at a central position, slightly forward the central position, slight backward the central position, slight leftward the central position, and slightly rightward the central position. When the user is at different positions, the clarity degree of the collected user pictures might be different, but the user in the user pictures collected at these positions should be judged as the living body. Therefore, it is possible to, upon obtaining positive samples, respectively obtain user pictures collected with the fixed-focal-length cameras when the user is located at different positions in the designated area. The user may include a plurality of different users.

The obtained negative samples may be user pictures collected with respect to the above-mentioned various attack manners.

After a sufficient number of positive samples and negative samples are obtained respectively, it is possible to train according to the training samples to obtain the classification model. The classification model may be a neural network model. How to train is of the prior art.

2) Living Body Detection

Actual living body detection may be performed after the training of the classification model is completed.

Specifically, the user pictures collected with the fixed-focal-length camera at a fixed position may be first obtained. The user pictures are full-length pictures or half-length pictures. Which type of pictures are specifically employed may depend on actual needs.

Then, it is feasible to input the collected user pictures into the classification model to thereby obtain a detection result about whether the user in the user pictures output by the classification model is the living body.

Figure 2:
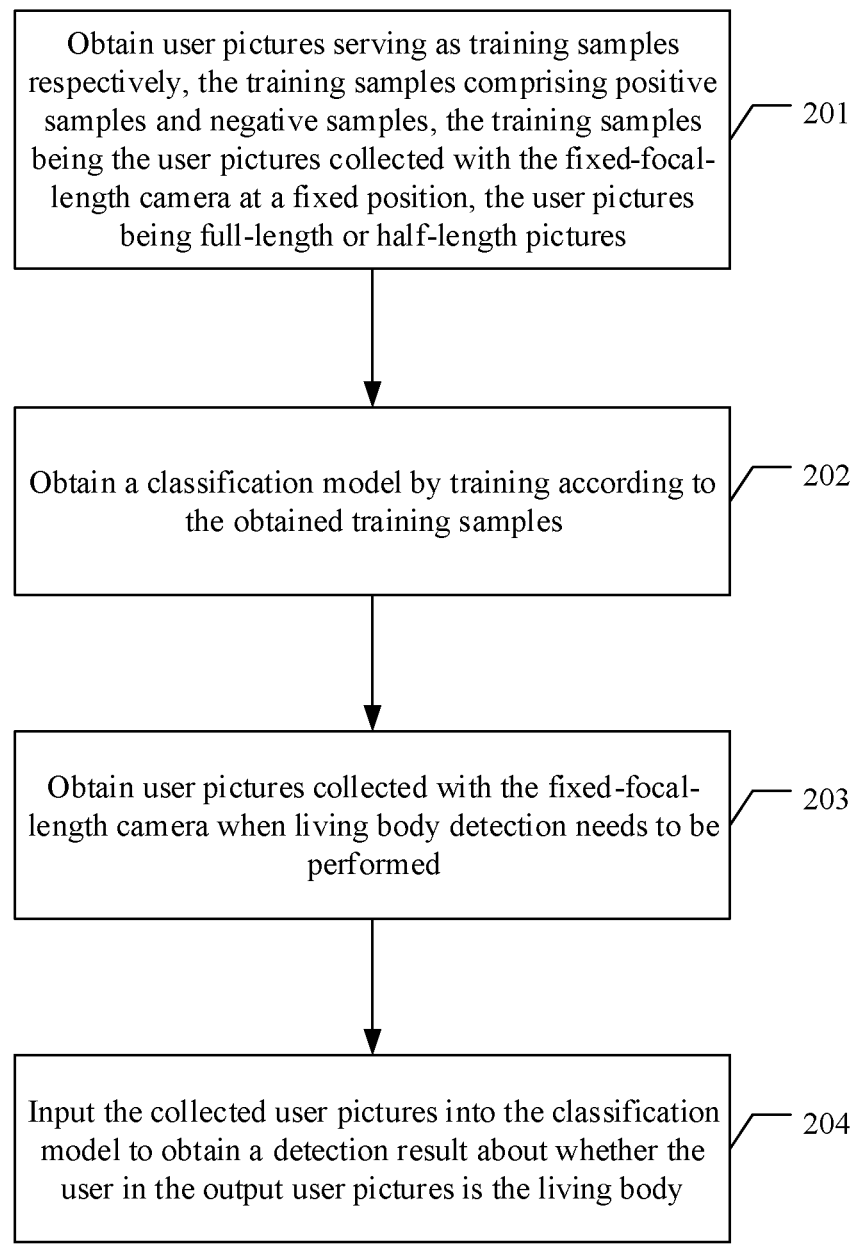
FIG. 2 is a flow chart of a preferred embodiment of the living body detecting method according to the present disclosure.

Based on the above introduction, FIG. 2 is a flow chart of a preferred embodiment of the living body detecting method according to the present disclosure. As shown in FIG. 2, the embodiment comprises the following specific implementation mode.

In 201, user pictures serving as training samples are obtained respectively. The training samples comprise positive samples and negative samples. The training samples are the user pictures collected with the fixed-focal-length camera at a fixed position. The user pictures are full-length pictures or half-length pictures.

In 202, a classification model is obtained according to the obtained training samples.

203 relates to obtaining user pictures collected with the fixed-focal-length camera when living body detection needs to be performed.

204 relates to inputting the collected user pictures into the classification model to obtain a detection result about whether the user in the output user pictures is the living body.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In addition, in the above embodiments, different emphasis is placed on respective embodiments, and reference may be made to related depictions in other embodiments for portions not detailed in a certain embodiment.

To sum up, according to the solution of the above method embodiment, it is possible to obtain user pictures collected by the fixed-focal-length camera at a fixed position, the user pictures being full-length or half-length pictures, and then determine whether the user in the user pictures is a living body according to a clarity degree of collected user pictures and whether there is a rim. That is, it is feasible to distinguish whether the user is a living body by using properties of the fixed-focal-length camera and according to the clarity degree of user pictures collected by the fixed-focal-length camera. As such, legal users only need to stand in the designated area corresponding to the focal length of the fixed-focal-length camera without need to cooperatively make acts such as blinking, nodding or opening mouth, thereby simplifying the user's operations. In addition, when an illegal user employs an attack manner such as video or picture, since the size of the picture is distinct from the size of the real user, it is necessary to approach the fixed-focal-length camera more than the real user to take a picture to obtain a full-length or half-length picture, thereby causing a large difference of the clarity degree between the collected user picture and the real user's picture, and thereby accurately detecting a non-living body based on the clarity degree, namely, improving the accuracy of the detection result; furthermore, it is also possible for the illegal user to employ an attack manner such as clipping a human face or using a screen to display a human face (placing in a facial area). Since the user picture collected in the above method embodiments is a full-length picture or half-length picture, it is very probably exposed out of the edge of the sheet of paper or rim of the screen so that the non-living body can be accurately detected; it can be seen that the solutions of the above method embodiments produce a better detection effect for various attack manners, and widely adapted.

For example, as far as door access control system of a company is concerned, employees' access to the office may be controlled by swiping the face. When an employee needs to enter the company, he may stand at a designated position, the fixed-focal-length camera located at a fixed position is used to collect a user picture, and whether the user in the user picture is a living body is determined based on the classification model obtained by training. If the user is a living body and the company's employee, the door may be opened to let him in.

The above introduces the method embodiments. The solution of the present disclosure will be further described through an apparatus embodiment.

Figure 3:
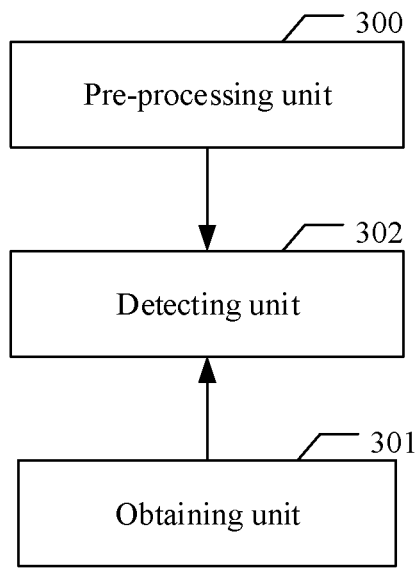
FIG. 3 is a structural schematic diagram of components of a living body detecting apparatus according to the present disclosure.

FIG. 3 is a structural schematic diagram of components of a living body detecting apparatus according to the present disclosure. As shown in FIG. 3, the living body detection apparatus comprises: an obtaining unit 301 and a detecting unit 302.

The obtaining unit 301 is configured to obtain user pictures collected by a fixed-focal-length camera at a fixed position, the user pictures being full-length or half-length pictures;

The detecting unit 302 is configured to determine whether the user is a living body according to a clarity degree of collected user pictures and whether there is a rim.

Since the fixed-focal-length camera has a fixed focal length, namely, an irradiation distance, a width and the like are fixed, when the location of the fixed-focal-length camera is fixed, images can be formed clearly only for a specific area, and image cannot be formed clearly outside the area.

Therefore, when the living body detection is performed, the user may be required to stand in a designated area (namely, the above-mentioned specific area), so that the fixed-focal-length camera is used to collect pictures of the user and obtain the user's pictures, which may be full-length or half-length pictures. The obtained user's picture will be clear pictures. As far as illegal user's attack is concerned, for example, the attack is launched in a way of using pictures displayed on a mobile phone and Pad, or various printed pictures of different materials. Since the size of the pictures is distinct from the size of the real user, it is necessary to approach the fixed-focal-length camera to take a picture to obtain a full-length or half-length picture. However, the so doing causes vague imaging, i.e., the clarity of the user picture collected by the fixed-focal-length camera is very poor. In this way, whether the user is a living body may be determined based on the clarity degree of the collected user pictures. In addition, it is also possible for the illegal user to employ an attack manner such as clipping a human face or using a screen to display a human face (placing in a facial area). Since the user picture collected in the present embodiment is a full-length picture or half-length picture, it is very probably exposed out of the edge of the sheet of paper or rim of the screen so that the non-living body can be accurately detected.

In addition, since the clarity degree of the picture is very difficult to evaluate with a definite index, the present embodiment proposes that a classification model may be obtained by pre-training in a deep learning manner. The process of training the classification model is a learning process. It is possible to learn what clarity degree meets requirements, and thereby judge the user in the user picture whose clarity degree meets requirements as a living body Correspondingly, the apparatus shown in FIG. 3 may further comprise: a pre-processing unit 300.

The pre-processing unit 300 is configured to obtain user pictures serving as training samples respectively, the training samples comprising positive samples and negative samples, the training samples being the user pictures collected with the fixed-focal-length camera, and then obtain a classification model by training according to the training samples.

The pre-processing unit 300 is configured to obtain user pictures collected with the fixed-focal-length camera when the user is located in a designated area, as positive samples, the designated area being an area which corresponds to a focal length of the fixed-focal-length camera and can collect clear pictures.

In addition, the pre-processing unit 300 is configured to respectively obtain user pictures collected with the fixed-focal-length cameras when the user is located at different positions in the designated area.

Since the designated area is usually an area of a certain size, when the user stands in the designated area, he might stand at different positions, for example, exactly at a central position, slightly forward the central position, slight backward the central position, slight leftward the central position, and slightly rightward the central position. When the user is at different positions, the clarity degree of the collected user pictures might be different, but the user in the user pictures collected at these positions should be judged as the living body. Therefore, it is possible to, upon obtaining positive samples, respectively obtain user pictures collected with the fixed-focal-length cameras when the user is located at different positions in the designated area. The user may include a plurality of different users.

The negative samples obtained the pre-processing unit 300 may be user pictures collected with respect to the above-mentioned various attack manners.

After a sufficient number of positive samples and negative samples are obtained respectively, the pre-processing unit 300 may train according to the training samples to obtain the classification model. The classification model may be a neural network model. How to train is of the prior art.

Actual living body detection may be performed after the training of the classification model is completed.

That is, the obtaining unit 301 may obtain the user pictures collected with the fixed-focal-length camera at a fixed position. The user pictures are full-length pictures or half-length pictures. Then, the detecting unit 302 may input the collected user pictures into the classification model to thereby obtain a detection result about whether the user in the user pictures output by the classification model is the living body.

Reference may be made to corresponding depictions in the aforesaid method embodiment for a specific workflow of the apparatus embodiment shown in FIG. 3. The workflow is not detailed any more.

As can be seen from the above, according to the solution of the above method embodiment, it is possible to obtain user pictures collected by the fixed-focal-length camera at a fixed position, the user pictures being full-length or half-length pictures, and then determine whether the user in the user pictures is a living body according to a clarity degree of collected user pictures and whether there is a rim. That is, it is feasible to distinguish whether the user is a living body by using properties of the fixed-focal-length camera and according to the clarity degree of user pictures collected by the fixed-focal-length camera. As such, legal users only need to stand in the designated area corresponding to the focal length of the fixed-focal-length camera without need to cooperatively make acts such as blinking, nodding or opening mouth, thereby simplifying the user's operations. In addition, when an illegal user employs an attack manner such as video or picture, since the size of the picture is distinct from the size of the real user, it is necessary to approach the fixed-focal-length camera more than the real user to take a picture to obtain a full-length or half-length picture, thereby causing a large difference of the clarity degree between the collected user picture and the real user's picture, and thereby accurately detecting a non-living body based on the clarity degree, namely, improving the accuracy of the detection result; furthermore, it is also possible for the illegal user to employ an attack manner such as clipping a human face or using a screen to display a human face (placing in a facial area). Since the user picture collected in the above method embodiments is a full-length picture or half-length picture, it is very probably exposed out of the edge of the sheet of paper or rim of the screen so that the non-living body can be accurately detected; it can be seen that the solutions of the above method embodiments produce a better detection effect for various attack manners, and widely adapted.

Figure 4:
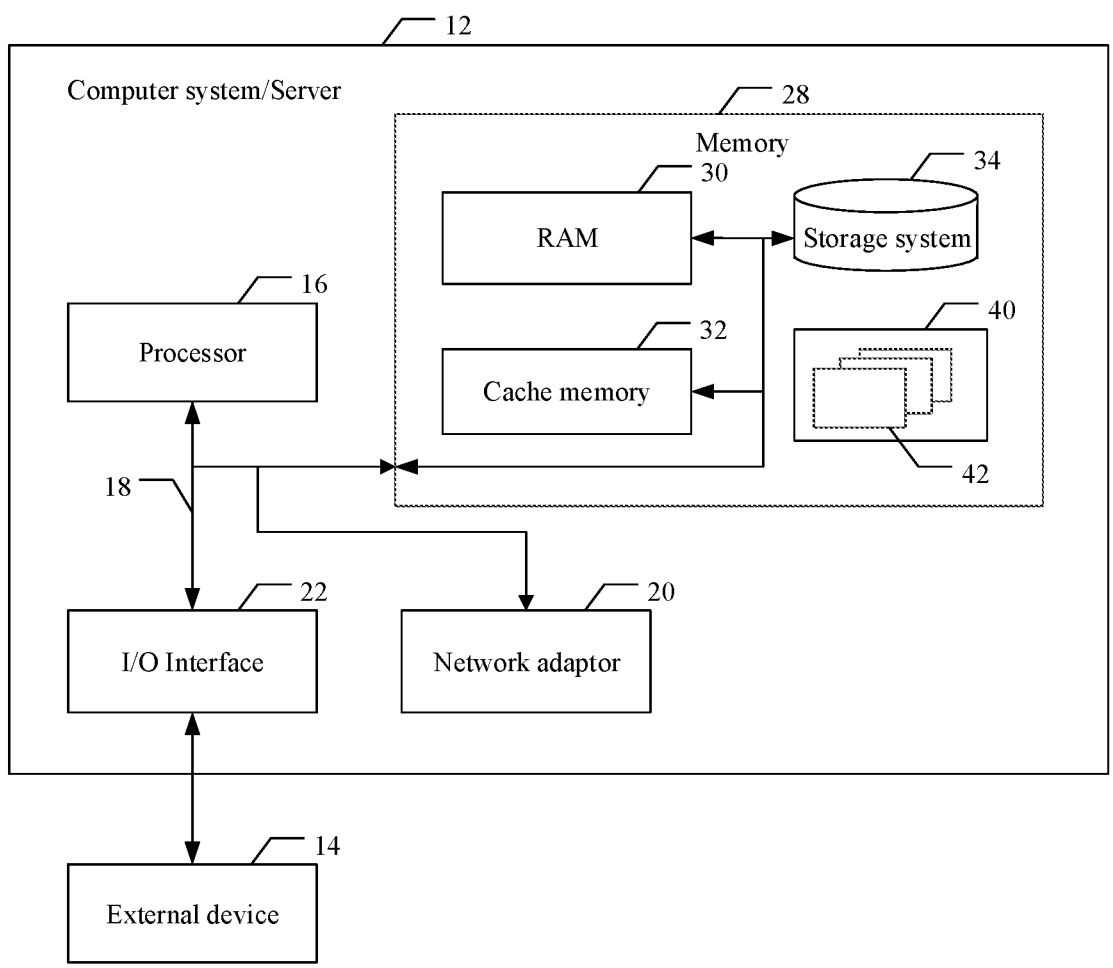
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, obtaining user pictures collected by a fixed-focal-length camera at a fixed position, the user pictures being full-length or half-length pictures; and determining whether the user is a living body according to a clarity degree of collected user pictures and whether there is a rim.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A living body detecting method, wherein the method comprises:
    obtaining user pictures collected by a prime lens camera at a fixed position, the user pictures being full-length or half-length pictures; and
    determining whether the user pictures are taken from a living body according to a clarity degree of collected user pictures and whether there is a border,
    wherein before obtaining user pictures collected by a fixed-focal-length camera at a fixed position, the method further comprises:
    obtaining user pictures serving as training samples respectively, the training samples comprising positive samples and negative samples, the training samples being the user pictures collected with the prime lens camera; and
    obtaining a classification model by training according to the training samples,
    the determining whether the user pictures are taken from a living body according to a clarity degree of collected user pictures and whether there is the border comprises:
    inputting the collected user pictures into the classification model to obtain a detection result about whether the user in the output user pictures is the living body.

2. The method according to claim 1, wherein
    a manner of obtaining the positive samples comprises:
    obtaining user pictures collected with the prime lens camera when the user is located in a designated area, as positive samples;
    the designated area being an area which corresponds to a focal length of the prime lens camera and can collect clear pictures.

3. The method according to claim 2, wherein
    the obtaining user pictures collected with the prime lens camera when the user is located in a designated area comprises:
    respectively obtaining user pictures collected with the prime lens cameras when the user is located at different positions in the designated area.

4. A computer device, comprising a memory, a processor and a computer program which is stored on the memory and runnable on the processor, wherein the processor, upon executing the program, implements a living body detecting method, wherein the method comprises:
    obtaining user pictures collected by a prime lens camera at a fixed position, the user pictures being full-length or half-length pictures; and
    determining whether the user pictures are taken from a living body according to a clarity degree of collected user pictures and whether there is a border,
    wherein before obtaining user pictures collected by a prime lens camera at a fixed position, the method further comprises:
    obtaining user pictures serving as training samples respectively, the training samples comprising positive samples and negative samples, the training samples being the user pictures collected with the prime lens camera; and
    obtaining a classification model by training according to the training samples,
    the determining whether the user pictures are taken from a living body according to a clarity degree of collected user pictures and whether there is the border comprises:
    inputting the collected user pictures into the classification model to obtain a detection result about whether the user in the output user pictures is the living body.

5. The computer device according to claim 4, wherein
    a manner of obtaining the positive samples comprises:
    obtaining user pictures collected with the prime lens camera when the user is located in a designated area, as positive samples;
    the designated area being an area which corresponds to a focal length of the prime lens camera and can collect clear pictures.

6. The computer device according to claim 5, wherein
    the obtaining user pictures collected with the prime lens camera when the user is located in a designated area comprises:

respectively obtaining user pictures collected with the prime lens cameras when the user is located at different positions in the designated area.

7. A non-transitory computer-readable medium on which a computer program is stored, wherein the program, when executed by a processor, implements a living body detecting method, wherein the method comprises:

obtaining user pictures collected by a prime lens camera at a fixed position, the user pictures being full-length or half-length pictures; and determining whether the user pictures are taken from a living body according to a clarity degree of collected user pictures and whether there is a border, wherein before obtaining user pictures collected by a prime lens camera at a fixed position, the method further comprises:

obtaining user pictures serving as training samples respectively, the training samples comprising positive samples and negative samples, the training samples being the user pictures collected with the prime lens camera; and obtaining a classification model by training according to the training samples, the determining whether the user pictures are taken from a living body according to a clarity degree of collected user pictures and whether there is the border comprises:

inputting the collected user pictures into the classification model to obtain a detection result about whether the user in the output user pictures is the living body.

8. The non-transitory computer-readable medium according to claim 7, wherein a manner of obtaining the positive samples comprises:

obtaining user pictures collected with the prime lens camera when the user is located in a designated area, as positive samples;

the designated area being an area which corresponds to a focal length of the prime lens camera and can collect clear pictures.

9. The non-transitory computer-readable medium according to claim 8, wherein the obtaining user pictures collected with the prime lens camera when the user is located in a designated area comprises:

respectively obtaining user pictures collected with the prime lens cameras when the user is located at different positions in the designated area.

* * * * *